Jan. 5, 1954    P. H. DRINKER    2,664,915
INTERRELATED AUTOMATIC AND MANUAL VALVE CONTROL
Filed Feb. 4, 1949    3 Sheets-Sheet 2

INVENTOR.
PEMBERTON H. DRINKER
BY
ATTORNEY

Jan. 5, 1954  P. H. DRINKER  2,664,915
INTERRELATED AUTOMATIC AND MANUAL VALVE CONTROL
Filed Feb. 4, 1949  3 Sheets-Sheet 3

*INVENTOR.*
PEMBERTON H. DRINKER
BY
Arthur H. Swanson
ATTORNEY

Patented Jan. 5, 1954

2,664,915

UNITED STATES PATENT OFFICE 2,664,915

INTERRELATED AUTOMATIC AND MANUAL VALVE CONTROL

Pemberton H. Drinker, Strafford, Pa., assignor to Minneapolis-Honeywell Regulator Company, Minneapolis, Minn., a corporation of Delaware Application February 4, 1949, Serial No. 74,682

17 Claims. (Cl. 137—653)

This invention relates to an air-operated controller which may be manually or automatically operated and which has at least one differential-pressure-operated motor for opening connection between the manual or the automatic operator and the final control element only when the pressure to be applied to the final control element is substantially equal to the pressure already applied to the final control element.

More specifically, it is an object of this invention to provide a control system having an automatically operated transmitter, a manually-operated transmitter, a transfer switch for connecting one of said transmitters to and for disconnecting the other of said transmitters from a final control element, a pair of valves each interposed between one of said transmitters and the final control element and a pair of differential pressure operated motors each exposed to the pressure in the final control element and to the pressure in one of said transmitters, so that the motor controlling the connection between the transmitter to be connected to the final control element will not permit this connection to open unless the pressure in the final control element and the pressure in the transmitter to be connected to it are substantially equal.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 1:
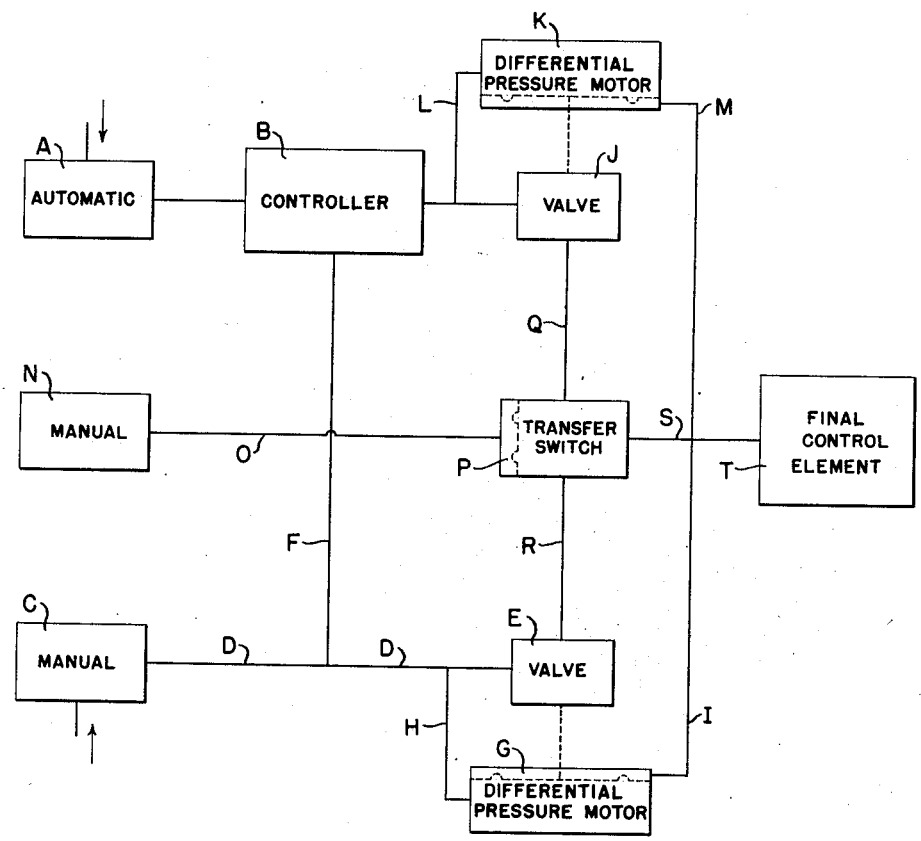
Figure 1 is a block diagram.
Figure 2:
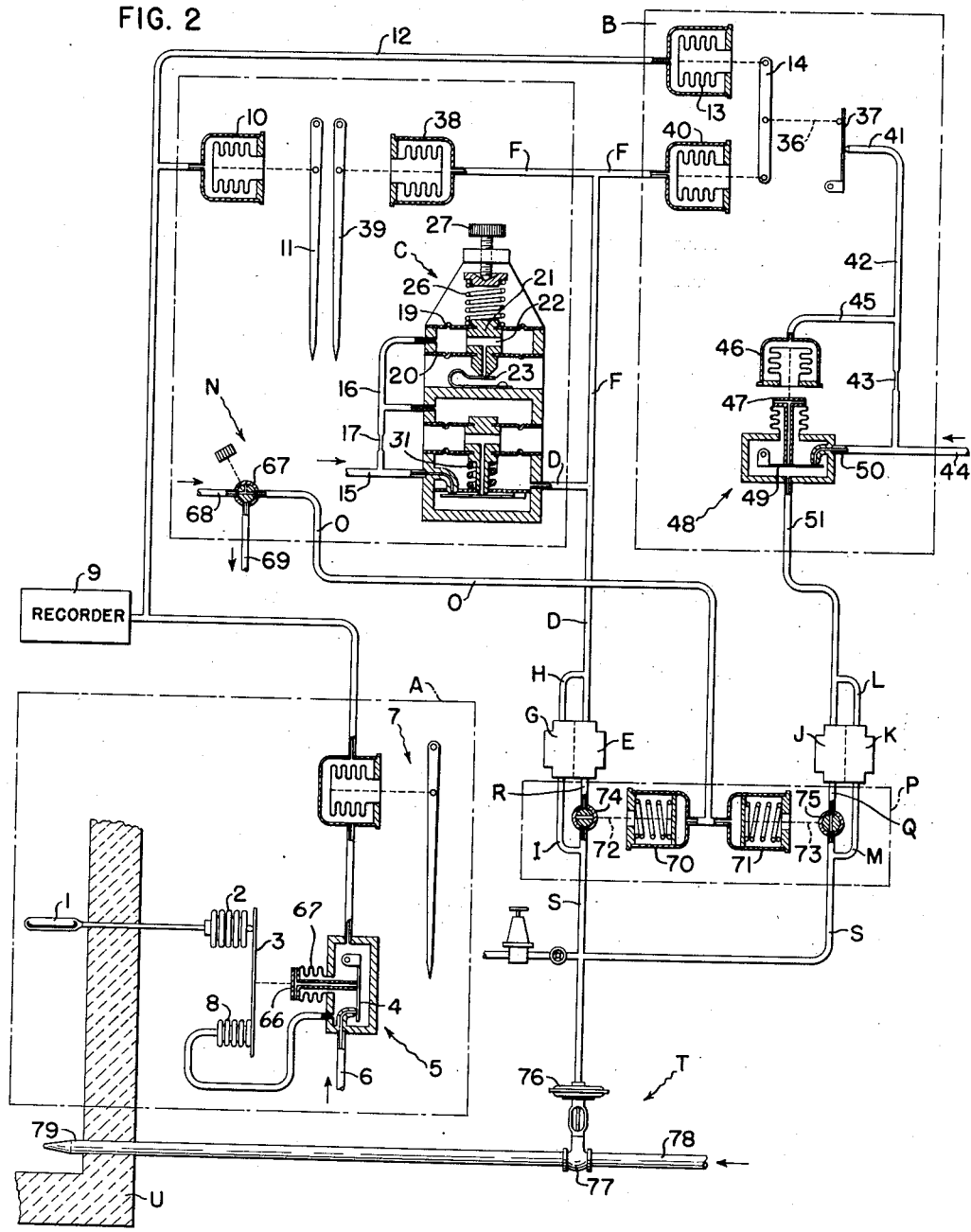
Figure 2 is a diagrammatic or schematic showing with parts generally in vertical cross section.

Figure 1 shows that the device includes an automatically-operated air-pressure transmitter A. Transmitter A includes a measuring instrument responsive to a variable which it is desired to control. As shown in Fig. 2, the measuring instrument is the thermometer bulb I of a gas filled system. Transmitter A also includes a pilot or relay valve connected so as to vary the pressure from a source of compressed air. Air pressure, varying in accordance with the measurements of the measuring instrument, is transmitted to a controller B which may be an air-operated controller of any well known type. Controller B may be blind, indicating or recording.

There is also provided a manually-operated air-pressure transmitter C. Transmitter C includes a hand-operated valve or other device controlling the flow of air from a source of compressed air. The air from manual transmitter C passes through pipe D to a double-ended valve E. The manually controlled air from transmitter C also passes through branch pipe F to controller B. The air so transmitted from the manual operator C is used to control the set point of controller B and thus position the set point of controller B to a value corresponding to the value supplied to valve E.

Valve E is operated by a differential-pressure motor G. Motor G is exposed through pipes H and I to the pressures on the inlet side and to the pressure on the outlet side of valve E. Similarly the output air from controller B is fed to a double-ended valve J which is also operated by a differential pressure motor K exposed through pipes L and M to the inlet pressure and to the outlet pressure on the valve J.

A third manually-operated air-pressure transmitter N comprises a hand operated valve which controls the supply of compressed air from a suitable source through pipe O to the air-operated motor of a transfer switch P. Transfer switch P connects the final control element T either to the automatic controller A or to the manual controller C. Valve P does this by connecting the output pipe S either to pipe R or to pipe Q and by closing the connection between outlet pipe S and that one of the pipes, Q or R, which is not selected. The outlet pipe S communicates with the final control element T. This final control element T may be a valve controlling the supply of fuel to the furnace or other device whose temperature is measured by the measuring element forming part of the automatic transmitter A.

The operation of this control system is as follows. Assume that the final control element T is being automatically controlled from transmitter A through controller B. If it is desired to shift the control of the final control element T to the manual transmitter C, the manual transmitter N is operated by hand so as to shift the transfer switch P to close the communication between pipes Q and S and to open the communication between pipes R and S. However, since motor G is exposed to the pressure in pipe S through pipe I and to the pressure in pipe D through pipe H, the valve E will not open communication between pipes D and R unless the pressure in pipe S, which is presently applied to the final control valve T, and the pressure in pipe D, which is about to be applied to the final control valve T, are approximately equal. Therefore, pressure can only be applied to the final control element which is substantially equal to that pressure applied to the final control element T at that instant. This avoids bumps or sudden movements of the final control element T when the shift is made from automatic to manual control.

The shift from manual to automatic control is made by a reverse sequence of operations to that just described. However, since valve J is only opened by motor K when the air pressures in pipes L and M are substantially equal, the pressure about to be applied to final control element T must be substantially equal to that presently applied to it. This makes for a smooth transfer of control.

Referring to Figure 2 for a more detailed showing of the device, the system is shown as applied to the control of a furnace U. The automatic air-pressure transmitter A includes a thermometer bulb 1 forming part of a gas filled, closed system including a bellows 2. Bellows 2 forms one input to a differential 3 whose output positions the flapper 4 of a pilot or relay valve 5 having an inlet nozzle 6, an exhaust nozzle 66 having a T-shaped exhaust port through it, and a bellows 67 connecting the exhaust nozzle 66 to the casing. The output air from air-relay 5 is fed to a bellows motor 8 which forms the other input of differential 3 so as to provide a rebalancing action. This output air from valve 5 corresponds to the function or measured variable sensed by measuring element 1. This "function" air passes to an indicator 7 and thence to a recorder or indicator 9.

The function air also passes to the bellows motor 10 which actuates pointer 11. The function air is also fed through pipe 12 to the controller B containing bellows motor 13 which forms one input of a differential 14.

Figure 3:
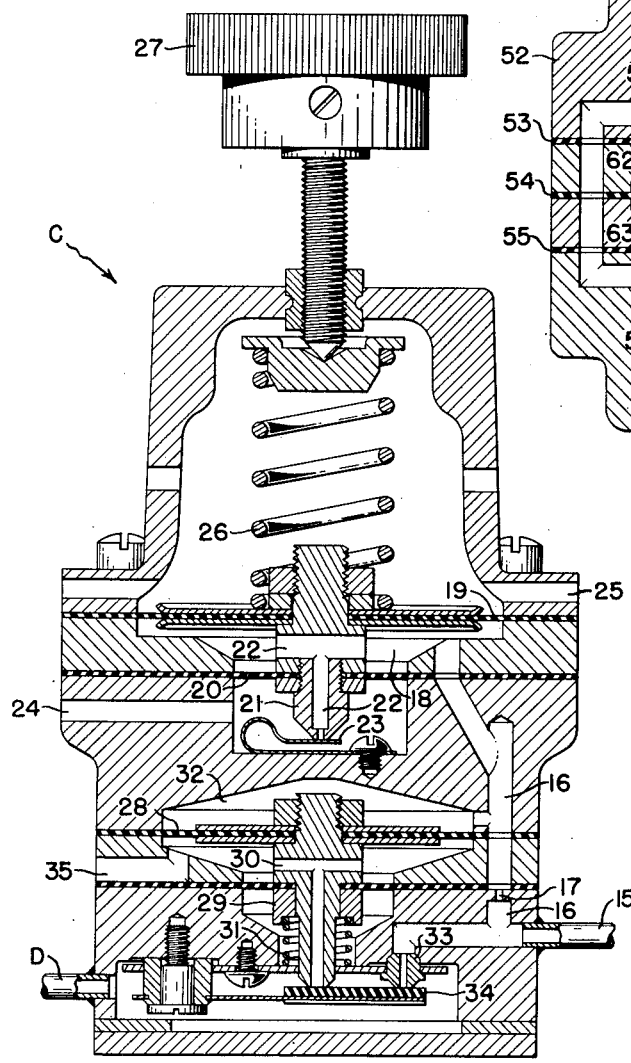
Figure 3 is a vertical cross section of a manually-operated air-pressure transmitter.

The manually-operated air-pressure transmitter C is shown in Fig. 2 and in greater detail in Fig. 3. Referring to Fig. 3, manual transmitter C includes an inlet pipe 15 for connection to a suitable source of compressed air. A conduit 16 branches upward from inlet pipe 15 and contains a restriction 17. Conduit 16 terminates in a cavity 18, between diaphragm 19 and diaphragm 20. Mounted on diaphragms 19 and 20 is a movable valve member 21 having a T-shaped port 22 extending through it. The lower end of port 22 is bled in varying amounts depending upon the position of valve member 21 with respect to spring member 23 which serves as a valve seat. An exhaust port 24 communicates with the space beneath diaphragm 20.

The space above diaphragm 19 is vented to the atmosphere through ports 25. Spring 26 is stressed at one end by a manually operable handle 27 and bears at its opposite end on diaphragm 19.

A diaphragm 28 supports a second movable valve member 29 which has a T-shaped port 30 through it. A spring 31 stresses valve member 29 and diaphragm 28 upward. Cavity 32 above diaphragm 28 communicates with conduit 16 above restriction 17.

Conduit 16 also communicates with an inlet nozzle 33. A flapper 34 cooperates with and is biased towards valve member 29 and also with inlet nozzle 33. A port 35 vents the space beneath diaphragm 28 and surrounding valve member 29. An outlet pipe D provides the off-take for the controlled air from the manually-operated transmitter C.

Returning to Fig. 2, it will be seen, that the outlet pipe D communicates with pipe F which branches and communicates with a bellows motor 38 which operates a pointer 39 and communicates with a bellows motor 40 which forms a second input to the differential 14.

Outlet pipe D continues downward and connects to pipe H and valve E.

The output of differential 14 is connected by means of link 36 to a flapper 37 which cooperates with a nozzle 41 forming the end of pipe 42 which communicates through a restriction 43 with an inlet pipe 44 connected to a suitable supply of compressed air. From pipe 42 a branch pipe 45 communicates with a bellows motor 46 which controls the exhaust valve 47 of a pilot or relay valve 48 having a flapper 49 controlling the flow of air through the exhaust valve 47 and the inlet nozzle 50 connected to inlet 44. The outlet pipe 51 leads to valve J and to a branch pipe L.

Figure 4:
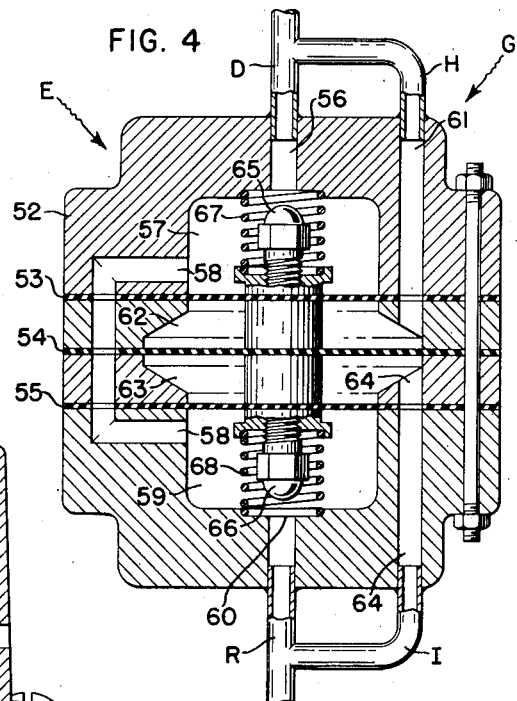
Figure 4 is a longitudinal cross section of a differential-pressure-operated valve.

Valves E and J and their cooperating differential pressure motors G and K are duplicates. The following description of valve E which is illustrated in Fig. 4 will serve also as a description of valve J and motor K. Inlet pipe D and branch pipe H enter a valve casing 52 which is separated into four compartments by diaphragms 53, 54 and 55. An inlet port 56 communicates with pipe D and with a chamber 57 above diaphragm 53. The port 58 passes through the valve casing 52 and through the diaphragms 53, 54 and 55 to communicate with a lower valve chamber 59. Chamber 59 has an outlet port 60 communicating with the off-take pipe R.

Branch pipe H communicates with a port 61 passing through diaphragm 53 and communicating with a pressure chamber 62 between diaphragms 53 and 54. Between diaphragms 54 and 55 is a second pressure chamber 63 communicating with off-take pipe 64 passing through diaphragm 55 and communicating with branch pipe I.

Pressure chambers 62 and 63 have large cross sections at diaphragm 54 and smaller cross sections at diaphragms 53 and 55, respectively. Mounted on the diaphragms are a pair of movable valve members 65 and 66 stressed towards an intermediate position by valve springs 67 and 68.

The operation of the valve is as follows. In the intermediate position the movable valve members 65 and 66 will disengage from the stationary valve seats formed by the inlet port 56 and the outlet port 60. This is due to the fact that air pressures in pipes H and I and consequently in chambers 62 and 63 are equal. If the pressure in chamber 62, for example, becomes greater than the pressure in chamber 63, spring 68 is compressed and movable valve member 66 seats against the end of outlet 60. This closes off the communication from pipe D, inlet 56, chamber 57, port 58, and chamber 59 to outlet 60 and pipe R.

In the foregoing description the area of diaphragm 53 which forms a wall of chamber 62 is described as being equal to the area of diaphragm 55 which forms a wall of chamber 63 so that the movable valve member 65—66 is moved to open or intermediate position when the pressures in chambers 62 and 63 are equal. It will be recognized that the areas of diaphragms 53 and 55 may be varied so that the valve is open when the pressures in chambers 62 and 63 are at some other relation than equal.

If the pressure in pipe I and consequently in chamber 63 should exceed the pressure in chamber 62, the reverse action would take place and movable valve member 65 would close against the inner end of port 66 shutting off the communication between pipes D and R. Thus, it will be seen that the chambers connected to pipes H and I form a differential-pressure-operated motor which closes the movable valve members 65 and 66 whenever the pressures in pipes H and I are unequal and conversely opens the communication between pipes D and R whenever the pressures therein are equal.

Returning to Fig. 2 the manually operable transmitter N is shown as comprising a three-way valve 67 connected to an inlet port 68 which communicates with a suitable supply of compressed air, with an exhaust port 69 communicating with atmosphere, and with the pipe O which leads to the transfer switch generally indicated at P.

Transfer switch P comprises a pair of bellows motors 70 and 71 which have mechanical connections 72 and 73 with a pair of through valves 74 and 75. Valves 74 and 75 connect with a branched off-take pipe S with whose branches the pipes I and M also communicate. Pipe S communicates with the final control element T which has an air-operated diaphragm motor 76 and a valve 77 operated thereby. Valve 77 controls the supply of fuel from an inlet 78 to a burner or like supply of heat for the furnace U.

While in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In an air-operated control device, an automatically-operated air-pressure transmitter, a manually-operated air-pressure transmitter, a controller under the control of either of said transmitters, a transfer switch controlling the connection of said controller or said manually-operated transmitter to a final control element, a pair of valves, one connected between said controller and said transfer switch and the other connected between said manual transmitter and said transfer switch to open or close communication therebetween, and a pair of differential-pressure-operated motors each connected to close one of said valves except when the air pressures in the inlet and in the outlet to said valve are within a pre-selected differential.

2. An air-operated control apparatus, including, a measuring instrument for sensing variations in a variable under control, an automatically-operating air-pressure transmitter connected under the control of said measuring instrument for transmitting variations in air pressure corresponding to the variations sensed by said measuring instrument, a manually-operated air-pressure transmitter, a controller under the control of either of said transmitters, a transfer switch controlling the connection of said controller or said manually-operated transmitter to a final control element, a pair of valves, one connected between said controller and said transfer switch and another connected between said manual transmitter and said transfer switch to open or close communication therebetween, and a pair of differential-pressure-operated motors each connected to close one of said valves except when the air pressure in the inlet and in the outlet to said valve are within a pre-selected differential.

3. An air-pressure operated mechanism for controlling a final control element from a distance, said mechanism including, an automatically-operated air-pressure transmitter, a manually-operated air-pressure transmitter, a transfer switch opening connection between one of said transmitters and the final control element and closing connection between the other of said transmitters and the final control element, a valve controlling the connection of one of said transmitters and said final control element, and a differential-pressure-operated motor responsive to the pressure of the transmitter to which said valve is connected and to the pressure of the final control element and arranged to open said valve when said pressures are at a selected relation.

4. A control device including, an automatically-operated air-pressure transmitter, a manually-operated air-pressure transmitter, a valve controlling the connection between said automatic transmitter and a final control element, a second valve controlling the connection between said manual transmitter and the final control element, transfer valve mechanism for connecting one of said valves and for disconnecting the other of said valves from the final control element, an air-operated motor controlling the operations of said transfer valve mechanism, and a manually operable valve controlling the operation of said air-operated motor.

5. In a control mechanism for a final control element, a controller responsive to automatic and to manual control, a valve connected between said controller and the final control element, and a differential-pressure-operated motor connected to the pressure of said controller and of the final control element and opening said valve only when said pressures are within a selected range.

6. In an air-pressure-operated automatically or manually actuated mechanism for operating a control valve, an air-pressure-operated device responsive to the pressure applied to the control valve, an air-pressure-operated device responsive to the air pressure about to be applied to the control valve, and a valve for opening a connection to the control valve when the pressures in said devices are equal or have some other predetermined relation.

7. In an air-operated control mechanism for a final control valve for changing the value of an action or condition, an air-pressure-controlling device automatically responsive to a variable selected for governing the operation of the final control valve, an air-pressure-controlling device manually operable for governing the operation of the final control valve, a valve for connecting the final control valve and one of said devices, and a motor connected to said last mentioned valve for opening said last mentioned valve when the pressures in said one of said devices and in said control valve are within a previously determined range of values and for closing the last mentioned valve when said pressures are not within said range.

8. In an air-pressure-operated automatically or manually actuated mechanism for operating a final control valve, an air-pressure-operated device responsive to air pressure which is automatically variable in response to a variable selected to govern the system, an air-pressure-operated device responsive to a manually-operated air pressure valve, a transfer valve for shifting the connection of the final control valve from the automatically variable air pressure to the manually variable air pressure and vice versa, a first valve connected between said automatically operated device and the final control valve, a differential-pressure-operated motor responsive to the air pressures in said automatically operated device and the final control valve for opening said first valve when the pressures in said automatically controlled device and the final control valve are in a desired ratio to one another, a second valve connected between said manually operated device and the final control valve, and a second differential-pressure-operated motor connected to the pressures in said manually operated device and in the final control valve and opening said second valve when said air pressures are in a desired ratio to one another.

9. A pneumatically operated controller for automatically or manually controlling a final control element regulating an action or condition, said controller including, a manually operable pressure regulator having an inlet connected to a supply of compressed air and having an outlet, a pneumatically operated relay valve having an inlet connected to a supply of compressed air and having an outlet through which there is an output of air variable under the automatic operation of a selected control condition, a transfer valve means for connecting the control element either under the manual control of said regulator or under the automatic control of said relay valve, a pair of valves for connecting the final control element to said regulator or to said relay valve as selected by said transfer valve means, and a pair of differential-pressure-operated motors each arranged to open one of said last named valves when the pressures on the inlet and outlet sides of said one valve are in a predetermined relation.

10. In a pressure-operated automatically actuated or manually controlled mechanism for operating a control element, a pressure-operated device responsive to the pressure applied to the control element, a pressure-operated device responsive to the pressure about to be applied to the control element, and a pressure-controlling element governing the application of pressure to the control element when the pressures in said pressure-operated devices are equal or have some other predetermined relation.

11. A controller for automatically or manually controlling a final control element regulating an action or condition, said controller including, a manually operable regulator having an inlet for connection to a supply of power and having an outlet, a relay having an inlet for connection to a supply of power and having an outlet through which there is an output of power variable under the automatic operation of a selected control condition, a transfer valve means adapted to connect the final control element to one of said outlets so that the final control element is either under the manual control of said regulator or under the automatic control of said relay, a pair of connection-controlling elements adapted to connect the final control element to said regulator or to said relay as selected by said transfer valve means, and a pair of differentially operated motors each arranged to open one of said connection-controlling elements when the pressures on the inlet and on the outlet sides of said one connection-controlling element are in a predetermined relation.

12. In a pressure-operated automatically or manually actuated mechanism for operating a final control element regulating an action or condition, a pressure-operated device responsive to an automatically-variable pressure controlled by a variable selected to govern the mechanism, a pressure-operated device responsive to a manually-variable pressure, a transfer valve means for shifting the connection of the final control element from the automatically-variable pressure to the manually-variable pressure and vice versa, a differential-pressure-operated motor responsive to the automatically-variable pressure and to the pressure in the final control element, a first valve connected under the control of said motor and between said device responsive to the automatically-variable pressure and the final control element, a second valve connected between said device responsive to manually-operable pressure and the final control element, and a second differential-pressure-operated motor having control of said second valve and responsive to the manually-variable pressure and to the pressure in the final control valve, each of said motors being operable to open one of said valves when the pressures in said motor are in a desired ratio to one another.

13. In an air-pressure-operated automatically or manually actuated mechanism for operating a control valve, means for automatically shifting between manual and automatic actuation without disturbing the value of the air pressure being impressed on the control valve at the time of the shift, said means including first valve means connecting the control valve to the manual or to the automatic operator therefor, a motor connected to the pressure applied to the control valve and to the pressure about to be applied to the control valve, and second valve means connected in series with said first valve means and operable by said motor so as to open communication to the control valve when the pressures are equal or have some other predetermined relation.

14. In an air-operated control device, an automatically operated air-pressure transmitter, a manually operated air-pressure transmitter including a casing, a manually operable handle mounted on said casing, a first diaphragm, a spring interposed between said handle and said diaphragm so that the position of said diaphragm is varied under the control of said handle, a chamber in said casing and having a wall formed by said first diaphragm and adapted to contain air pressure opposing movements of said diaphragm in response to said handle, an exhaust valve for wasting air from said chamber when the pressure therein exceeds a predetermined value, a second chamber in said casing, a second diaphragm forming a wall of said second chamber, a connection between said chambers and a source of compressed air, a controller under the control of either of said transmitters, a transfer switch controlling the connection of said controller or said manually operated transmitter to a final control element, a pair of valves, one connected between said controller and said transfer switch and the other connected between said manually operated transmitter and said transfer switch to open or close communication therebetween, and a pair of differential-pressure-operated motors each connected to close one of said valves except when the air pressures in the inlet and in the outlet to said valve are within a preselected differential.

15. In a control device for a final control element, an automatically operated air-pressure transmitter, a manually operated air-pressure transmitter including a casing, a manually operable handle mounted on said casing, a first diaphragm, a spring interposed between said handle and said diaphragm so that the position of said diaphragm is varied under the control of said handle, a chamber in said casing and having a wall formed by said first diaphragm and adapted to contain air pressure opposing movements of said diaphragm in response to said handle, an exhaust valve for wasting air from said chamber when the pressure therein exceeds a predetermined value, a second chamber in said casing, a second diaphragm forming a wall of said second chamber, a connection between said chambers and a source of compressed air, a second exhaust valve mounted so as to be moved by the movements of said second diaphragm, a third chamber in said casing, an inlet nozzle in said third chamber and connected with a source of compressed air, a flapper mounted in said third chamber and biased toward engagement with said second exhaust valve and said inlet nozzle, a controller under the control of either of said transmitters, a transfer switch controlling the connection of said controller or said manually operated transmitter to a final control element, a pair of valves, one connected between said controller and said transfer switch and the other connected between said manually-operated transmitter and said transfer switch to open or close communication therebetween, and a pair of differential-pressure-operated motors each connected to close one of said valves except when the air pressures in the inlet and the outlet to said valve are within a preselected differential.

16. In an air-operated control device, an automatically operated air-pressure transmitter, a manually operated air-pressure transmitter, a controller under the control of either of said transmitters, a transfer switch controlling the connection of said controller or said manually operated transmitter to a final control element, a pair of valves, one connected between said controller and said transfer switch and the other connected between said manually operated transmitter and said transfer switch to open or close communication therebetween, said valves each having a hollow casing through which pass an inlet and an outlet, a movable valve member arranged to open or close communication between said inlet and said outlet, a diaphragm providing a support for said movable valve member, a pair of chambers in said valve casing on opposite sides of said diaphragms, a second inlet passing through said diaphragm and communicating with one of said chambers, and a second outlet passing through said casing and communicating with the other of said chambers, whereby said chambers tend to move said valve member to close connection between said first inlet and said first outlet when the pressures in said inlet and in said outlet are not within a preselected differential.

17. In an air-operated control device according to claim 16, in which said valves each have three diaphragms therein dividing the interior of the casing into four chambers, a port through the interior of said casing and the diaphragms connecting the inlet and the outlet, and springs yieldingly stressing the movable valve member toward that position in which the connection between the inlet and the outlet is open and against the stress of any differential pressure caused by any difference in pressure in the air in said chambers.

PEMBERTON H. DRINKER.

References Cited in the file of this patent
UNITED STATES PATENTS

| Number | Name | Date |
|---|---|---|
| 1,556,614 | Lane | Oct. 13, 1925 |
| 1,956,010 | Diescher | Apr. 24, 1934 |
| 2,121,936 | Thomas | June 28, 1938 |
| 2,369,887 | Eckman | Feb. 20, 1945 |
| 2,410,966 | Eaton | Nov. 12, 1946 |
| 2,474,355 | Griswold | June 28, 1949 |
| 2,507,606 | McLeod | May 16, 1950 |